United States Patent [19]

Goto et al.

[11] Patent Number: 5,183,650
[45] Date of Patent: Feb. 2, 1993

[54] MICRO-PARTICULATE ALUMINOSILICATE AND PROCESS FOR PRODUCING THE SAME

[75] Inventors: Yoshiaki Goto, Otsu; Kozo Arai, Kiryu, both of Japan

[73] Assignee: Tokushu Kika Kogyo Co., Ltd., Osaka, Japan

[21] Appl. No.: 686,517

[22] Filed: Apr. 17, 1991

[51] Int. Cl.⁵ .............................................. C01B 33/34
[52] U.S. Cl. ..................................................... 423/710
[58] Field of Search ............... 423/118, 328, 329, 330; 502/60, 64, 77, 79

[56] References Cited

U.S. PATENT DOCUMENTS

| | | | |
|---|---|---|---|
| 4,371,510 | 2/1983 | Christophliemk et al. | 423/328 |
| 4,372,931 | 2/1983 | Ambs | 423/328 |
| 4,416,805 | 11/1983 | Kostinko | 423/328 |
| 4,649,036 | 3/1987 | Pastorello et al. | 423/328 |
| 4,894,214 | 1/1990 | Verduijn et al. | 423/328 |
| 4,957,719 | 9/1990 | Taga et al. | 423/328 |

FOREIGN PATENT DOCUMENTS

| | | |
|---|---|---|
| 0115680 | 8/1984 | European Pat. Off. |
| 2951192 | 7/1980 | Fed. Rep. of Germany |
| 1190447 | 12/1985 | Italy |
| 57-11819 | 1/1982 | Japan ................... 423/328 |
| 58-208127 | 12/1983 | Japan |
| 60-71518 | 4/1985 | Japan ................... 423/328 |
| 60-251121 | 12/1985 | Japan ................... 423/328 |
| 63-8212 | 1/1988 | Japan ................... 423/329 |

OTHER PUBLICATIONS

Vaughan, D. E. W. "The Synthesis and Manufacture of Zeolites" Chem. Eng. Progr. Feb. 1988 pp. 25-31.

*Primary Examiner*—R. Bruce Breneman
*Attorney, Agent, or Firm*—Oliff & Berridge

[57] ABSTRACT

A micro-particulate aluminosilicate suitable for use as an ion exchanger, adsorbent or the like has a mean particle size of not greater than 3 μm (micrometers), preferably not greater than 1 μm, as measured by precipitation particle size distribution measuring method. The micro-particulate aluminosilicate is produced by a process having the steps of preparing an aqueous solution as a solvent, the aqueous solution containing a water-soluble polymer dissolved therein; adding to the aqueous solution a metal hydroxide or a metal salt, a metal aluminate and colloidal silica as essential components and stirring the mixture to uniformly disperse the essential components so as to form a cake; and synthesizing the micro-particulate aluminosilicate by allowing the cake to mature followed by heating.

3 Claims, 16 Drawing Sheets

Fig. 5
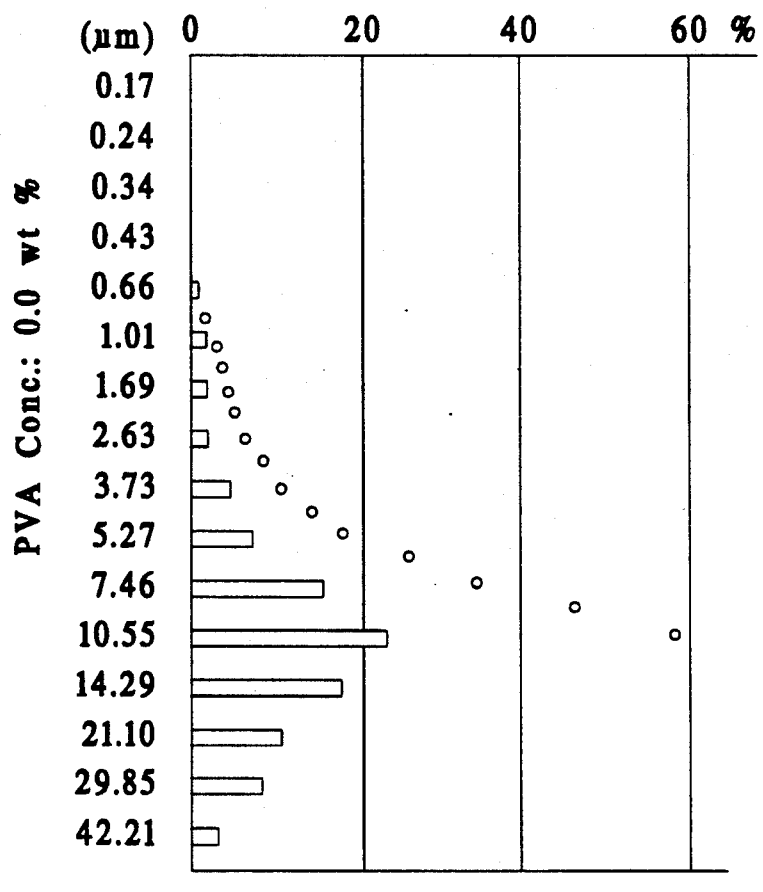
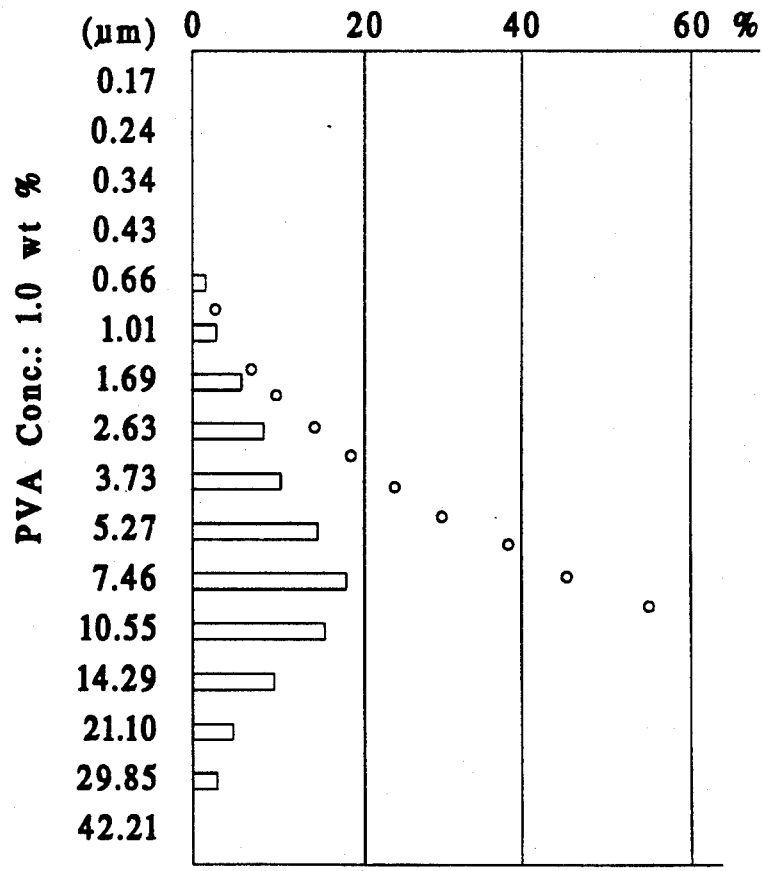

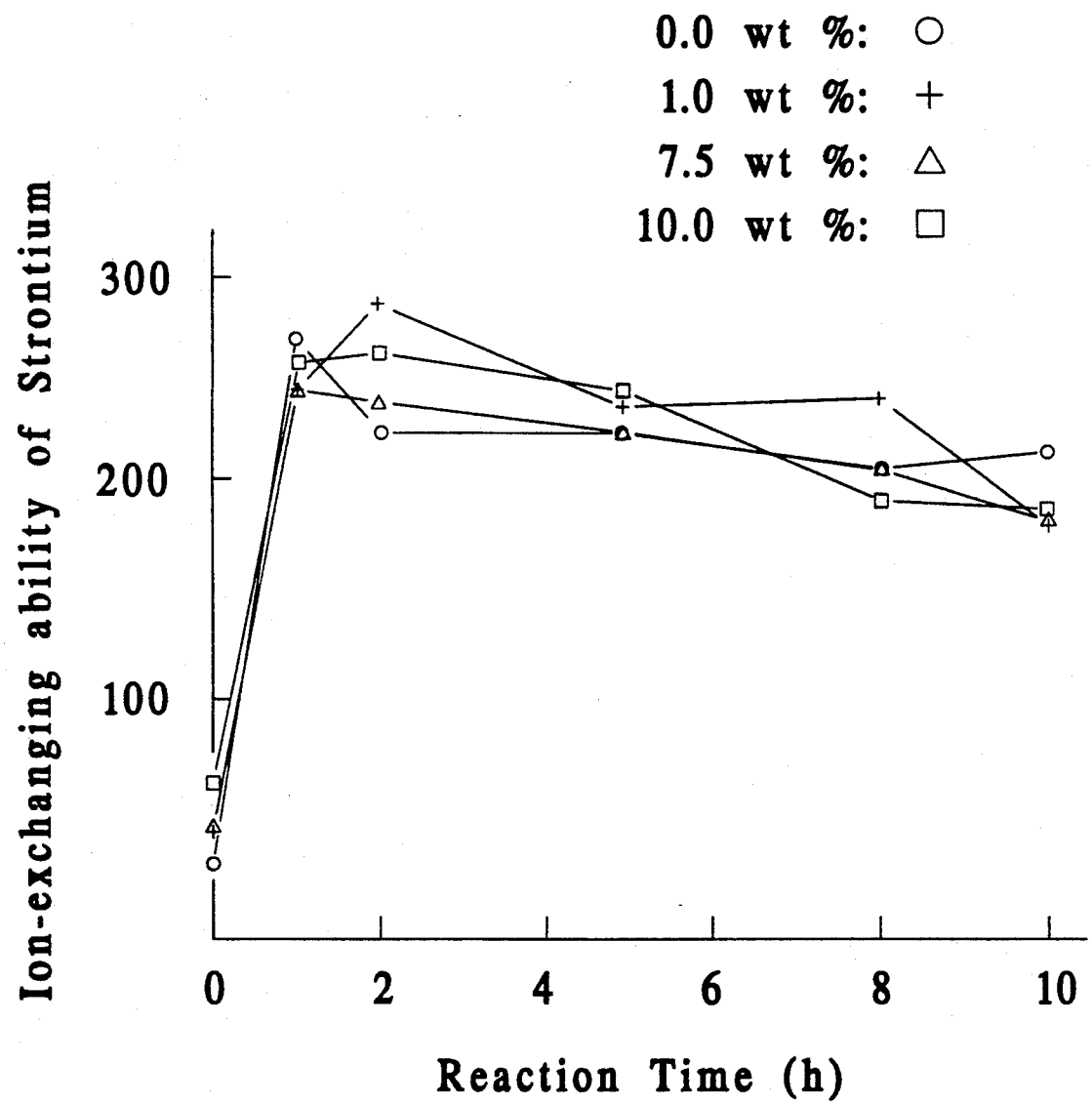
Fig. 6 GELATIN CONCENTRATION

FIG. 7B
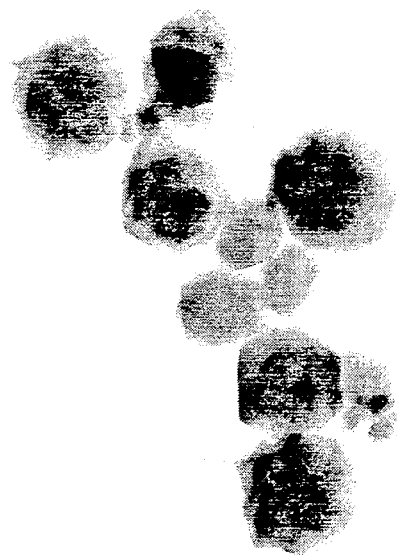

Gelatin Conc. 5.0 wt%

F I G. 10 A
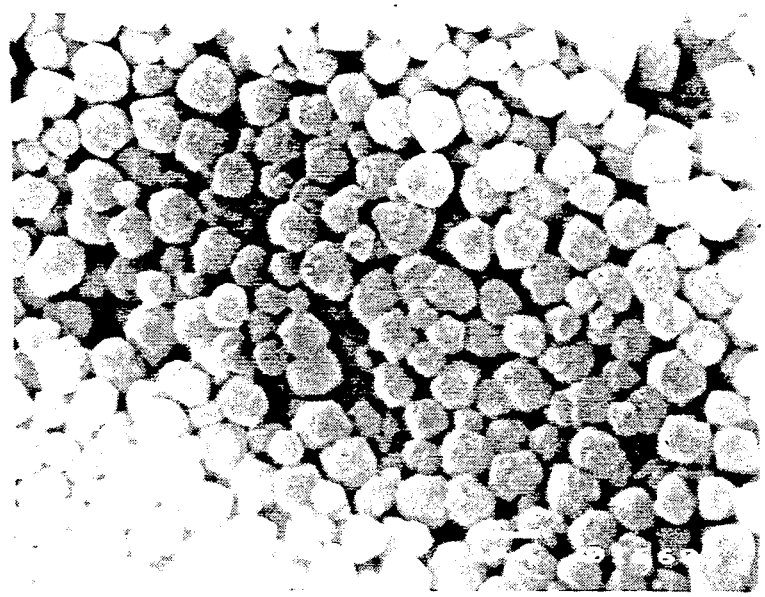
F I G. 10 B
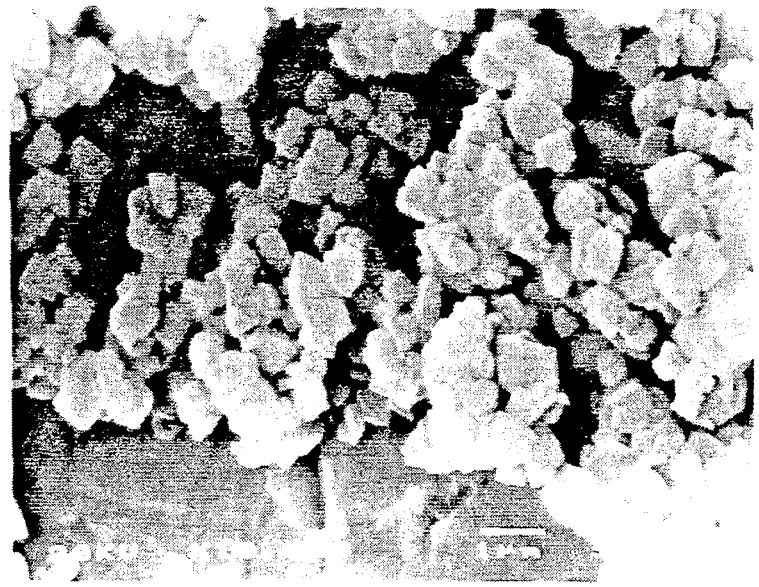

GELATIN CONCENTRATION 3.0 wt%

| Type | Reaction Time (min.) | Strontium Ion - Exchange Ability (meq/100g) | | Type | Reaction Time (min.) | Strontium Ion - Exchange Ability (meq/100g) | |
| --- | --- | --- | --- | --- | --- | --- | --- |
| | | Experiment 6 | Comparison Example 6 | | | Experiment 7 | Comparison Example 7 |
| Zeolite Y | 0 | 0 | 0 | Zeolite A | 0 | 0 | 0 |
| | 5 | 194 | 184 | | 5 | 340 | 159 |
| | 30 | 210 | 185 | | 30 | 350 | 276 |
| | 300 | 213 | 189 | | 300 | 370 | 371 |

Fig. 14

MICRO-PARTICULATE ALUMINOSILICATE AND PROCESS FOR PRODUCING THE SAME

BACKGROUND OF THE INVENTION

1. Field of the Invention

The present invention relates to micro-particulate aluminosilicate synthesized in an aqueous solution and process of producing the micro-particulate aluminosilicate.

2. Description of Related Art

In general, it has been well known to artificially synthesize zeolite as an aluminosilicate by using a metal hydroxide or a metal salt, aluminate of a metal and colloidal silica. Nowadays, zeolite is finding a spreading use in various industrial fields because of its useful functions and characteristics such as ion exchanging of metal ions, sieving of molecules, adsorption of gases such as carbon dioxide, nitrogen oxide and sulfur oxide, reactive catalytic action, and so forth. Although natural zeolite is available, proportion of artificially synthesized zeolite is increasing because of large impurity content and lack of uniformity of particle size of natural zeolite.

As one of process for synthesizing zeolite, it has been attempted to bring a metal hydroxide or a metal salt, aluminate of a metal and colloidal silica into reaction in an aqueous solution. This process does not necessitate any specific equipment because it relies upon a simple mechanism of reaction conducted in an aqueous solution and, therefore, has been widely adopted as a synthesizing process for an artificial mass-production of zeolite at a low cost.

In recent years, there is an increasing demand for artificial production of designed aluminosilicate particles, e.g., uniformalization of particle size, refining of particles, increase in the purity and polygonal particle configuration approximating a spherical in place of conventional cubic or rectangular form of particles, in order to cope with current requirements for enhancement of ion-exchanging ability, ion-exchanging speed, absorbability and adsorption speed. This synthesis process for producing aluminosilicate in an aqueous solution, however, suffers from the following disadvantages. Namely, speed of growth of crystals after generation of crystal nucleus is high because of low viscosity of solvent, so that the mean particle size in terms of particle size distribution measured by precipitation method is as large as 6 $\mu$m. In addition, the particle sizes are distributed over a wide range. Thus, the above-described process could not provide ultra-fine aluminosilicate particles of a mean particle size not greater than 4 $\mu$m and having a narrow range of particle size distribution.

SUMMARY OF THE INVENTION

Accordingly, an object of the present invention is to provide a micro-particulate aluminosilicate and a process for producing such micro-particulate aluminosilicate.

According to one aspect of the present invention, there is provided a micro-particulate aluminosilicate formed by allowing a metal hydroxide or a metal salt, a metal aluminate and colloidal silica to react in a solvent formed of an aqueous solution, the micro-particulate aluminosilicate having a mean particle size of not greater than 3 $\mu$m (micrometers) as measured by precipitation particle size distribution measuring method.

In a preferred form of the invention, the mean particle size of the micro-particulate aluminosilicate is not greater than 1 $\mu$m (micrometers) as measured by precipitation particle size distribution measuring method.

According to another aspect of the present invention, there is provided a process for producing a micro-particulate aluminosilicate, comprising the steps of: preparing an aqueous solution as a solvent, the aqueous solution containing a water-soluble polymer dissolved therein; adding to the aqueous solution a metal hydroxide or a metal salt, a metal aluminate and colloidal silica as essential components and stirring the mixture to uniformly disperse the essential components so as to form a cake; and synthesizing the micro-particulate aluminosilicate by allowing the cake to mature followed by heating.

In a preferred form of the process in accordance with the invention, the addition of the metal hydroxide or metal salt, metal aluminate and colloidal silica is conducted by adding the colloidal silica first to the aqueous solution in which the water-soluble polymer is uniformly dissolved, stirring the mixture to uniformly disperse the colloidal silica, gradually adding aqueous solutions of the metal hydroxide or metal salt and the metal aluminate, and the cake is obtained by conducting as necessitated a strong agitation of the mixture after addition of the metal hydroxide or metal salt and the metal aluminate.

According to the invention, an aqueous solution dissolving a water-soluble polymer is advantageously used as the solvent. This solvent provides an effective means for suppressing drastic growth of aluminosilicate particles in reaction taking place in the aqueous solution so as to form a large quantity of ultra-fine particles of uniform particle size. Examples of water-soluble polymer suitably used are natural water-soluble polymers such as gelatin, $\beta$-cellulose, alginic acid and carboxymethylcellulose, including natural polymers which have been changed to water-soluble polymers through denaturation, and synthesized water-soluble polymer such as polyvinylalcohol, polyacrylamide and so forth. One of these polymers may be used alone or two or more of these polymers may be used simultaneously.

The metal hydroxide or metal salt suitably used in the process of the present invention may be those which are ordinarily used for synthesis of zeolite, such as sodium hydroxide, potassium hydroxide, calcium hydroxide, strontium hydroxide, ferrous or ferric chloride, nickel chloride, and so forth. Examples of the metal aluminate suitably used are sodium aluminate, potassium aluminate, calcium aluminate, cobalt aluminate and other aluminates of these aluminate may be, used alone or two or more of them may be used simultaneously.

The process of the present invention can provide ultra-fine aluminosilicate particles of a mean particle size not greater than 3/$\mu$m with a high degree of uniformity of the particle size, for the following reasons.

In the process of the invention, the field of generation of crystals is a polymeric viscous solution, i.e., an aqueous solution of a water-soluble polymer, unlike a mere non-viscous aqueous solution used in the known process. Therefore, the reaction reagent reacts while being surrounded by the water-soluble polymer dissolved as a solvent in the aqueous solution. Therefore, the growth of crystals is retarded in the process for forming zeolite from an amorphous matter as a precursor of zeolite as compared with the case where the reaction process in a less-viscous aqueous solution as in the conventional process. Thus, the crystals grow steadily and slowly, allowing generation of a greater number of nucleous. Growth of such nucleous also takes place under the retarded condition.

The aluminosilicate in accordance with the present invention, needless to say, may or may not contain a large quantity of amorphous as the precursor of zeolite.

The present invention can be successfully carried out for production of various types of zeolite which can be synthesized in aqueous solution system, such as zeolite A, zeolite X, zeolite Y, zeolite Z, zeolite ZSM-5 and mordenite.

According to the invention, it is possible to produce artificial aluminosilicate particles of ultra-fine and uniform particle size, by virtue of retardation of growth of crystals offered by the use of an aqueous solution of a water-soluble polymer as the solvent. Thus, according to the present invention, it is possible to stably enlarge the field for producing crystalline nucleuses by a reaction and to effect a control of the whole reaction for generating zeolite from an amorphous as a reaction for generating zeolite from an amorphous as a precursor, which enlargement of a field and control have been materially impossible by the conventional process which uses a mere aqueous solution. Consequently, the present invention makes it possible to produce ultra-fine aluminosilicate particles of a mean particle size not greater than 3 $\mu$m and having a narrow particle size distribution of several micrometers ($\mu$m).

The ultra-fine aluminosilicate particles of narrow particle size distribution have large surface areas and rounded polygonal configurations approximating spheres. Consequently, ion exchanging ability is remarkably improved as compared with products of conventional process. According to the invention, it is thus possible to obtain functional ultra-fine aluminosilicate particles which can cope with demands of various fields.

BRIEF DESCRIPTION OF THE DRAWINGS

FIG. 5 is a graph showing particle size distribution of reaction product in Experiment IV conducted by using an aqueous solution of polyvinyl alcohol as the solvent;

FIG. 6 is a graph showing ion-exchanging ability of the reaction product in Experiment V;

FIGS. 7A and 7B are electron-microscopic photos of particle construction of reaction product obtained in Experiment I using a solvent having gelatin content of 0.0 wt %, as observed at moments 1 hour and 10 hours after commencement of the reaction, respectively;

FIGS. 10A and 10B, respectively, electron-microscopic photos showing particle constructions of reaction products in Experiment VI and a Comparative Experiment;

FIG. 14 is a graph showing the ion-exchanging ability data measured by Experiment VIII.

DETAILED DESCRIPTION OF THE PREFERRED EMBODIMENTS

The invention will be more fully understood from the following description of Experiments in which an electron-microscope model JEM 4000 or Model T-330A EX produced by Nippon Denshi Kabushiki Kaisha was used for microscopic observation of reaction products. Used also was a centrifugal precipitation particle size measuring apparatus model SA-CP3 produced by Kabushiki Kaisha Shimazu Seisakusho.

EXPERIMENT I

Each of a plurality of triple-inlet flask was charged with 40 cc of water, and 4 gram (g) of sodium hydroxide, 2 g of sodium aluminate and 4 g of 40 wt % aqueous solution of colloidal silica were mixed in the water, followed by addition of gelatin as the water-soluble polymer. The amount of addition of gelatin was varied to provide aqueous solutions of different gelatin concentrations: Namely, 0.0 wt %, 0.1 wt %, 0.5 wt %, 1.0 wt %, 3.0 wt %, 5.0 wt %, 7.5 wt % and 10.0 wt %. After being stirred, the aqueous solutions were allowed to mature for 1 hour at the room temperature, and was made to react by being heated to and maintained at 100° C., with the reaction time varied up to 10 hours.

The reaction product obtained through 10-hour reaction was filtrated and the filtrate was rinsed with water followed by drying, whereby white crystals were obtained. The white crystals were confirmed to be faujasite, through a powder X-ray diffraction analysis. It was also confirmed that the crystals are zeolite Y, as a result of measurement of lattice constant.

Figure 1:
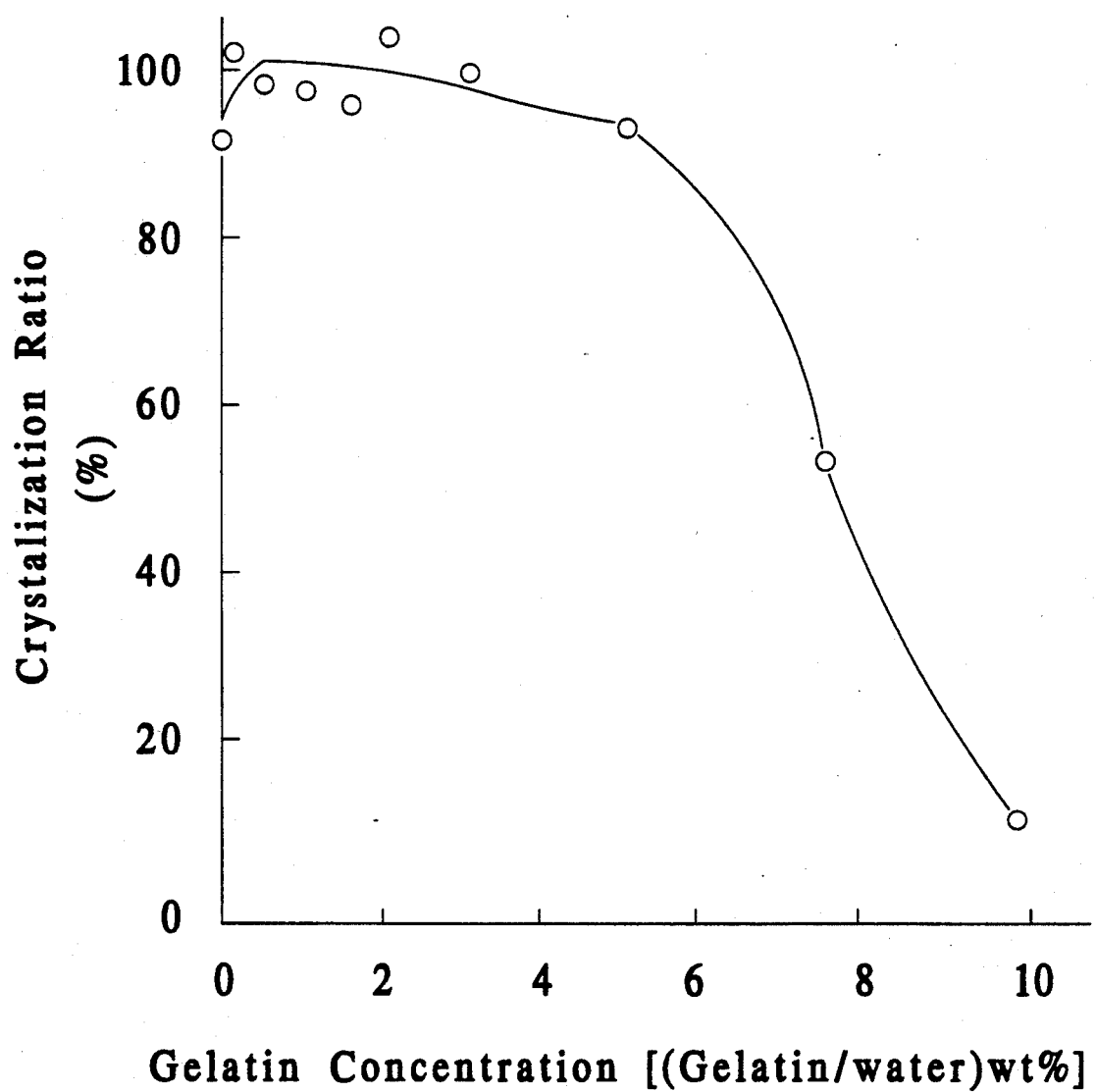
FIG. 1 is a graph showing crystallization ratio of reaction product in Experiment I conducted by using aqueous solution of gelatin as a solvent.

FIG. 1 shows the yields of the reaction products. It will be seen that the yield decreases drastically when the gelatin content exceeds 5.0 wt %, thus proving effect of gelatin to retard generation of zeolite Y.

Aluminosilicate samples were obtained by filtering the reaction products produced with gelatin contents of 0.0 wt %, 1.0 wt %, 7.5 wt % and 10 wt %, as obtained at moments 1 hour, 2 hours, 5 hours, 8 hours and 10 hours after commencement of reaction. Changes in the rates of generation of zeolite were observed on these filtrates to obtain results shown in FIG. 2. Filtrated matters of aluminosilicate other than crystallized zeolite Y were amorphous and were confirmed to be constituted by aluminosilicate of extremely fine particles having several hundreds of Å, through X-ray diffraction analysis.

Figure 2:
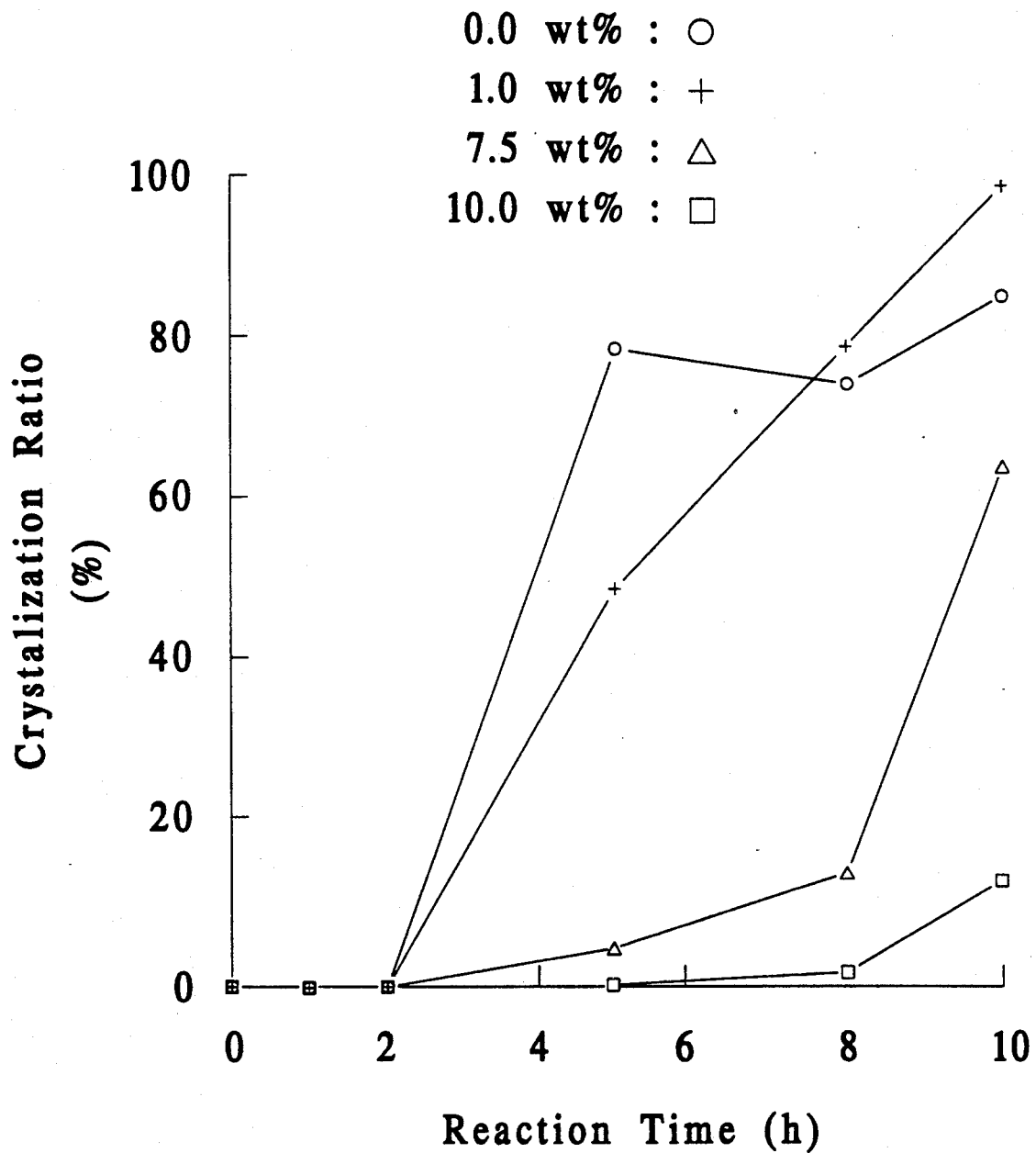
FIG. 2 is a graph showing the state of generation of zeolite in Experiment I.

FIG. 2 shows the yields of these reaction products. It will be seen that the yield decreases drastically when the gelatin content exceeds 5.0 wt %, thus proving effect of gelatin to retard generation of zeolite Y.

EXPERIMENT II

Figure 3:
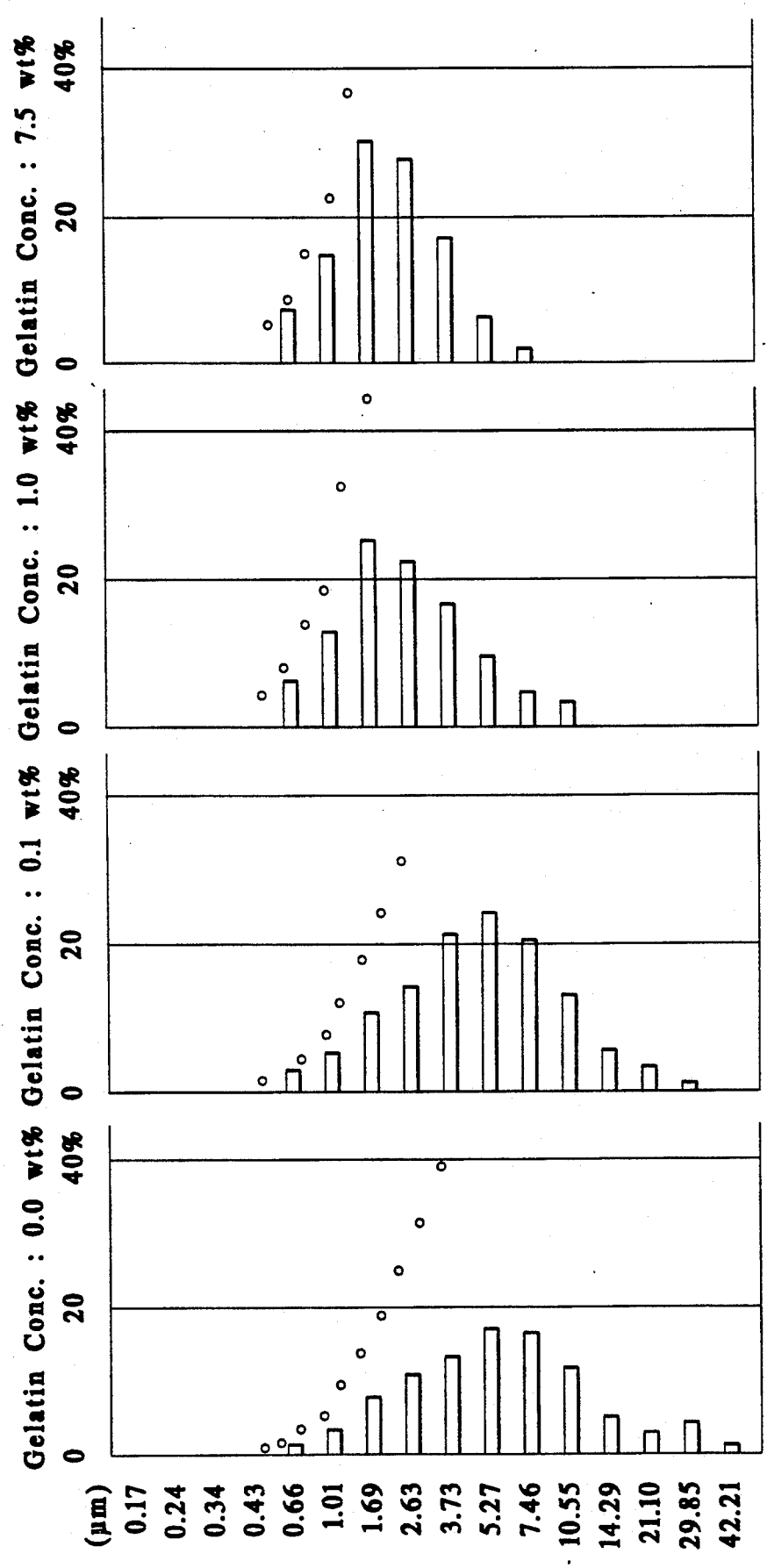
FIG. 3 is a graph showing particle size distribution of a reaction product in Experiment II.

Particle size distributions were measured on the different samples of zeolite Y obtained with gelatin contents of 0.0 wt %, 0.1 wt %, 1.0 wt % and 7.5 wt %. The results are shown in FIG. 3. It is to be noted, however, the zeolite Y obtained by the use of the aqueous solution containing 7.5 wt % of gelatin was formed through a 20-hour reaction to obtain a yield of 98%.

From FIG. 3, it will be understood that, in the sample obtained with the aqueous solution which did not contain gelatin (comparative example), the particle sizes were wide-spread from 0.66 $\mu$m to 42.1 $\mu$m, and the particle size of cumulative 50% was 4.71 $\mu$m. In contrast, all the samples prepared by using aqueous solutions containing gelatin showed narrower ranges of particle size distribution as measured by precipitation method, as well as smaller mean particle size (cumulative 50%). More specifically, the samples produced by using aqueous solutions of gelatin contents of 0.1%, 1.0% and 7.5% respectively showed mean particle sizes of 3.55 $\mu$m, 1.97 $\mu$m and 1.70 $\mu$m. This clearly shows that the samples of zeolite Y produced by using aqueous solutions containing gelatin have higher degrees of uniformity of particle size than the sample produced without using gelatin. It is also understood that smaller width of particle size distribution and, hence, a greater degree of uniformity of the particle size are obtained when the gelatin content in the aqueous solution is increased. Furthermore, an electron-microscopic observation of the thus-obtained crystals showed that the crystal configuration is rounded, i.e., approaches an octo-face structure, as the gelatin content is increased, as will be seen from FIG. 7.

It is also confirmed that the mean particle size of zeolite Y decreases in accordance with a rise in the gelatin content.

EXPERIMENT III

Figure 4:
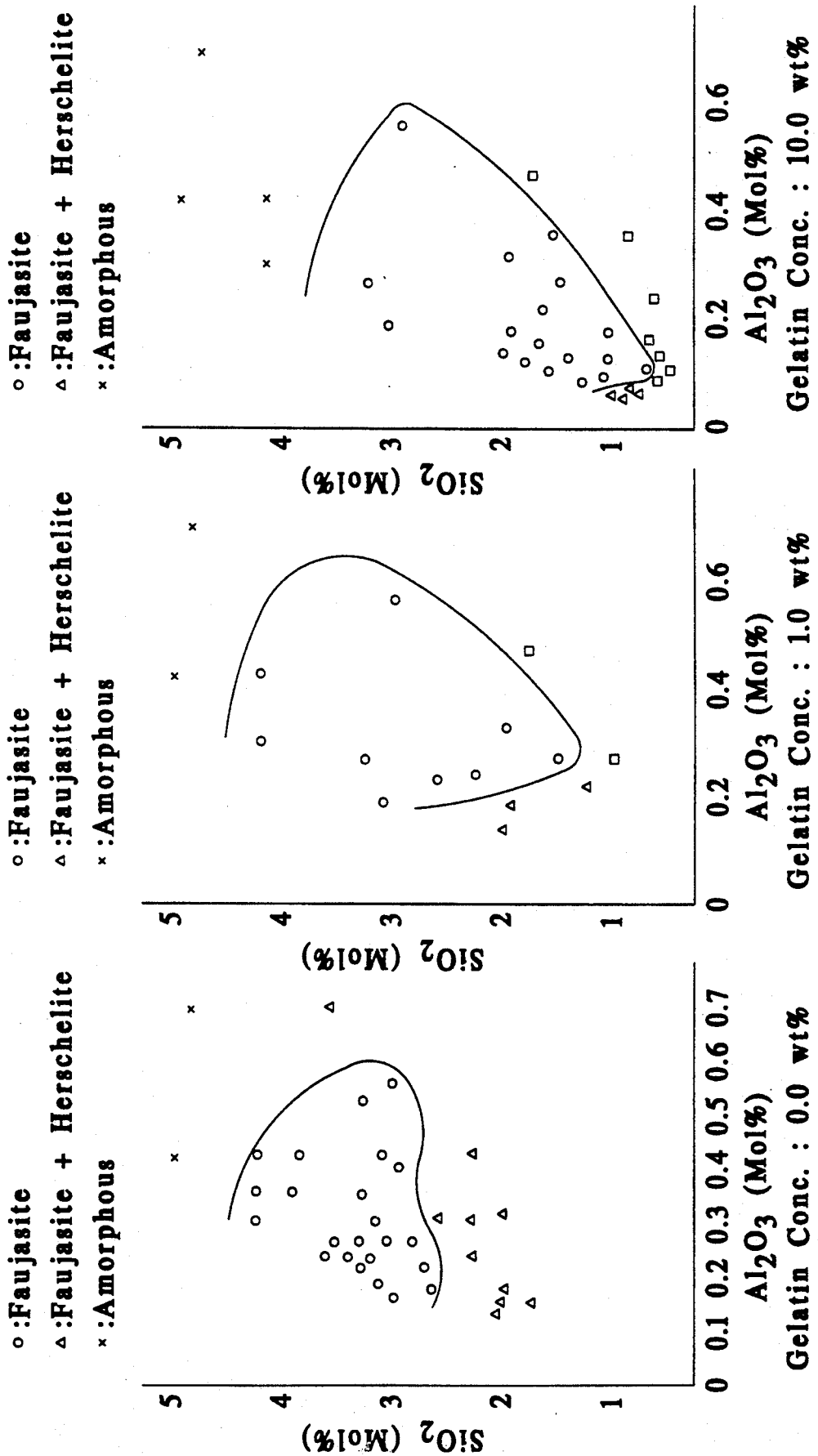
FIG. 4 is a graph showing compositions of reaction products in Experiment III.
Figure 7A:
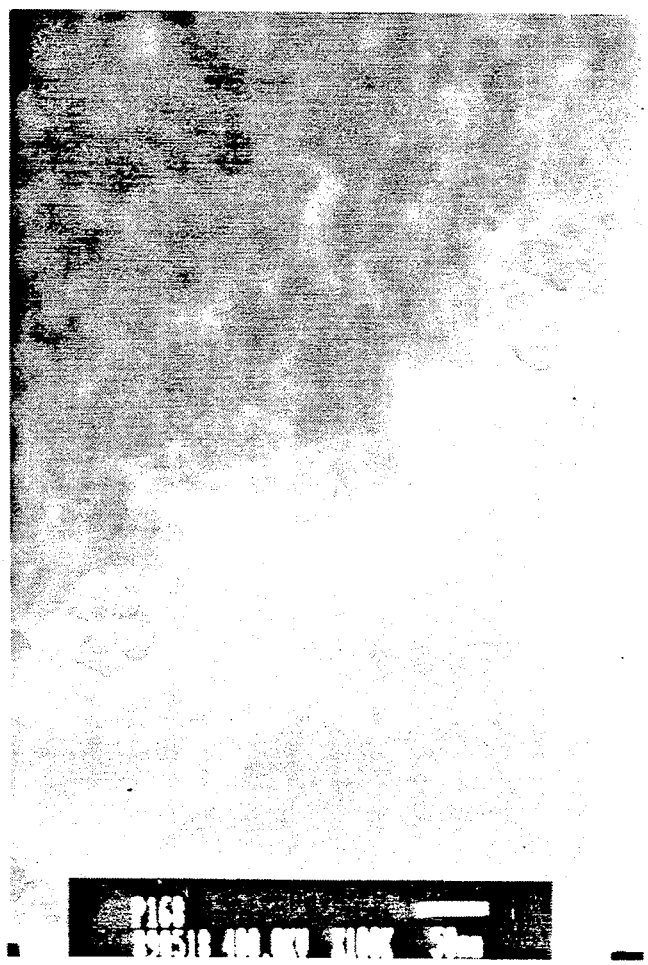
Figure 7C:
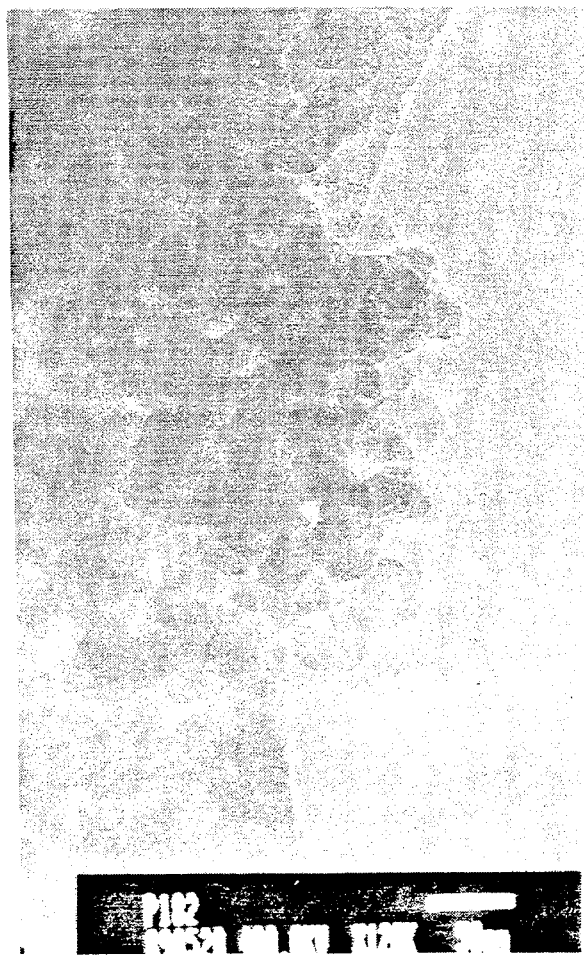
FIGS. 7C and 7D are electron-microscopic photos of particle construction of reaction product obtained in Experiment I using a solvent having gelatin content of 10.0 wt %, as observed at moments 1 hour and 10 hours after commencement of the reaction, respectively.
Figure 7D:
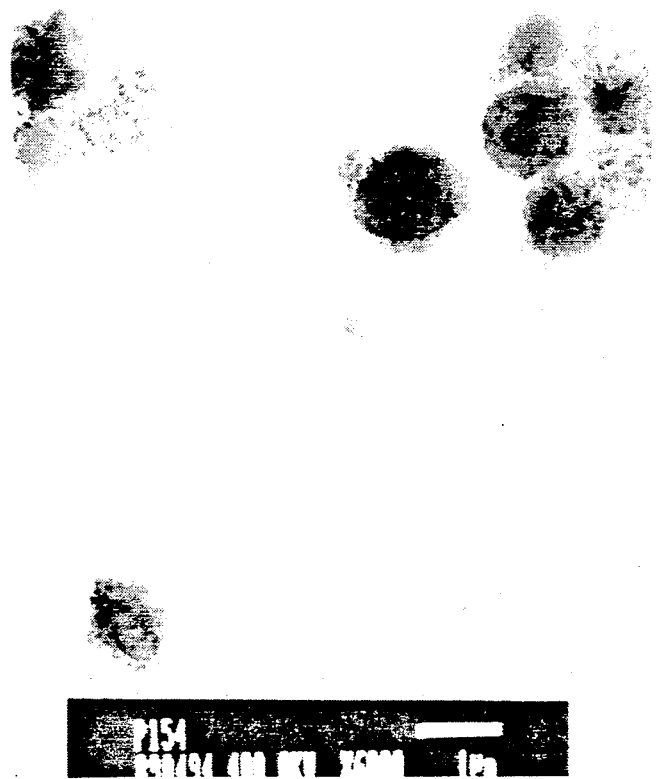
Figure 7E:
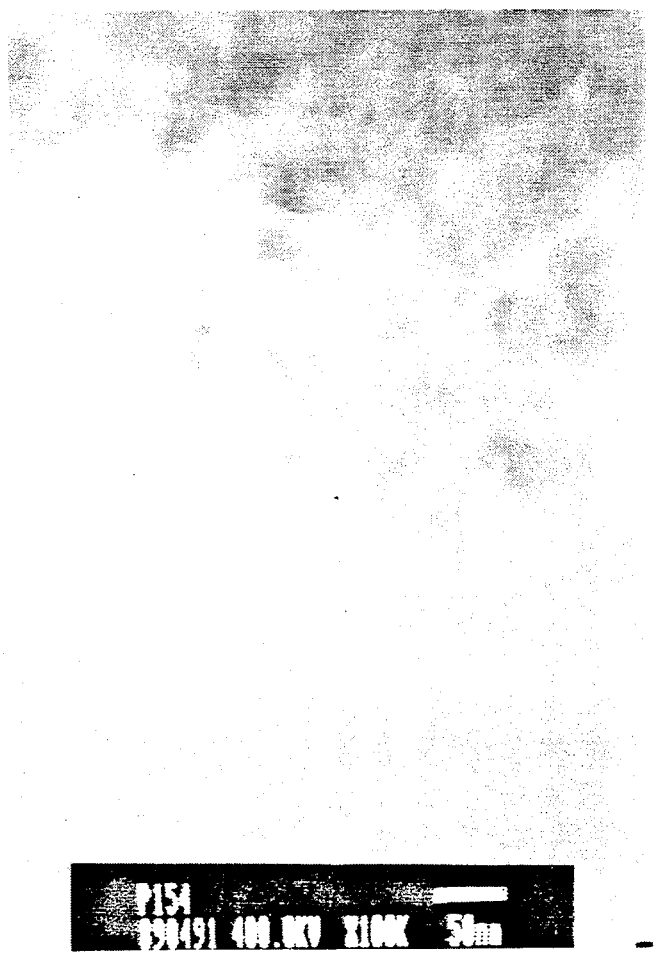
FIG. 7E is an electron-microscopic photo of construction of particle in amorphous portion of reaction product obtained in Experiment I using a solvent having gelatin content of 10.0 wt %, as observed at a moment 10 hours after commencement of the reaction, respectively.

Samples of zeolite Y were produced under the same reaction conditions as Experiment I while varying the amounts of sodium aluminate and 40 wt % aqueous solution of colloidal silica, and regions in which zeolite Y is obtainable in single phase were examined in each of the cases of the gelatin content being 0.0 wt %, 1.0 wt % and 10.0 wt %, the results being shown in reaction composition chart in FIG. 4.

As will be understood from FIG. 4, when gelatin was not used, zeolite Y was obtainable only in the form of a mixture with herechelite and could not be obtained as a single phase, in the region where the content of silicon oxide was 2.5 mol % or less. In contrast, when gelatin was used in amount of 1.0 wt %, zeolite Y as single phase could be obtained even when the content of silicon oxide was reduced to 1.0 mol %. Reduction in the silicon oxide content means increase in the aluminum oxide content in zeolite Y, which suggests enhancement of the ion-exchanging ability and catalytic activity of the zeolite Y.

In the case where the gelatin content was increased to 10.0 wt %, single phase of zeolite Y could be obtained even in a region of further decreased silicon oxide content.

It is thus understood that addition of gelatin widens the region of generation of zeolite Y as compared with the case where gelatin is not added. Thus, zeolite Y having higher aluminum content can be obtained easily by the use of gelatin.

EXPERIMENT IV

Each of a plurality of triple-inlet flask was charged with 28 cc of water in which were added 0.5 g of sodium hydroxide, 1.5 g of sodium aluminate and 30 g of 40 wt % aqueous solution of colloidal silica. Then, polyvinyl alcohol (saponification value 98.5%, polymerization degree 2400) was added to the respective mixtures so as to form aqueous solutions having polyvinyl alcohol contents of 0.0 wt % and 0.1 wt %. The aqueous solutions were then stirred and allowed to mature for 15 hours at the room temperature. The reaction products were then filtered and the filtrates were rinsed with water followed by drying, whereby samples white powders of zeolite A were obtained.

The particle size distributions of these samples were measured to obtain results as shown in FIG. 5. It will be seen that the sample obtained by using polyvinyl alcohol provides a narrower range of particle size distribution and smaller particle size, as compared with the sample obtained without using polyvinyl alcohol. It was also confirmed through another experiment that the use of polyvinyl alcohol widens the region of generation of zeolite, as in the case where gelatin is used.

EXPERIMENT V

Experiment V was conducted to examine the ion exchanging ability of the product, by using the samples of ultra-fine aluminosilicate particles obtained in Experiment I. The ion-exchanging ability was measured by putting the sample in an aqueous solution of strontium chloride and calculating the amount of strontium consumed through exchange of ions. The results of the measurement are shown in FIG. 6. As will be seen from this Figure, the sample obtained with reaction time being zero exhibits only a small ability of ion exchange. In contrast, the amorphous phases obtained through 1-hour or longer reactions showed ion exchanging ability equivalent or superior to that of zeolite.

It is to be specifically pointed out that superior ion exchanging ability is developed by the phase obtained at a moment 1 hour after the commencement of reaction, i.e., before generation of zeolite is confirmed. In view of this fact, electron-microscopic photos were taken of the reaction products obtained at moments 1 hour and 10 hours after the commencement of the reaction, for each of the samples obtained with gelatin contents of 0.0 wt % and 10.0 wt %, respectively. These photos are shown in FIGS. 7A to 7D. It will be seen from FIG. 7C that the sample produced with the use of 10.0 wt % gelatin exhibits an amorphous phase composed of extremely fine particles of a particle size around 500 Å (=50 nm) at the moment 10 hours after the commencement of the reaction. These extremely fine particles forming amorphous phase were scattered and left on the surface of static water for 48 hours. The particles were held afloat without substantial precipitation. The amorphous phase showed a transparency substantially equivalent to that of colloid.

EXPERIMENT VI

A reaction vessel made of a stainless steel having an internal volume of 5 l was charged with 1200 cc of water of 103 g of gelatin. The mixture was stirred to allow gelatin to be uniformly dissolved in water, thus forming a water-soluble solvent. Then, 540 g of 40 wt % aqueous solution of colloidal silica was added to the solvent and stirred so as to be uniformly dispersed in the solvent. Meanwhile, an aqueous solution was prepared by dissolving 160 g of sodium hydroxide and 56 g of sodium aluminate in 370 cc of water. The thus-prepared aqueous solution was gradually added to an mixed with the solvent containing the above-mentioned dispersed phase at 30° C., and the mixture was strongly agitated by a strong shearing homo-mixer so as to form a cake.

The cake was then left for 1 hour at the room temperature for maturing and was then heated to and maintained at 100° C. for 10 hours for reaction.

The reaction product was filtered and filtrate was rinsed with water, followed by drying, whereby white powder of zeolite Y was obtained.

Figure 8:
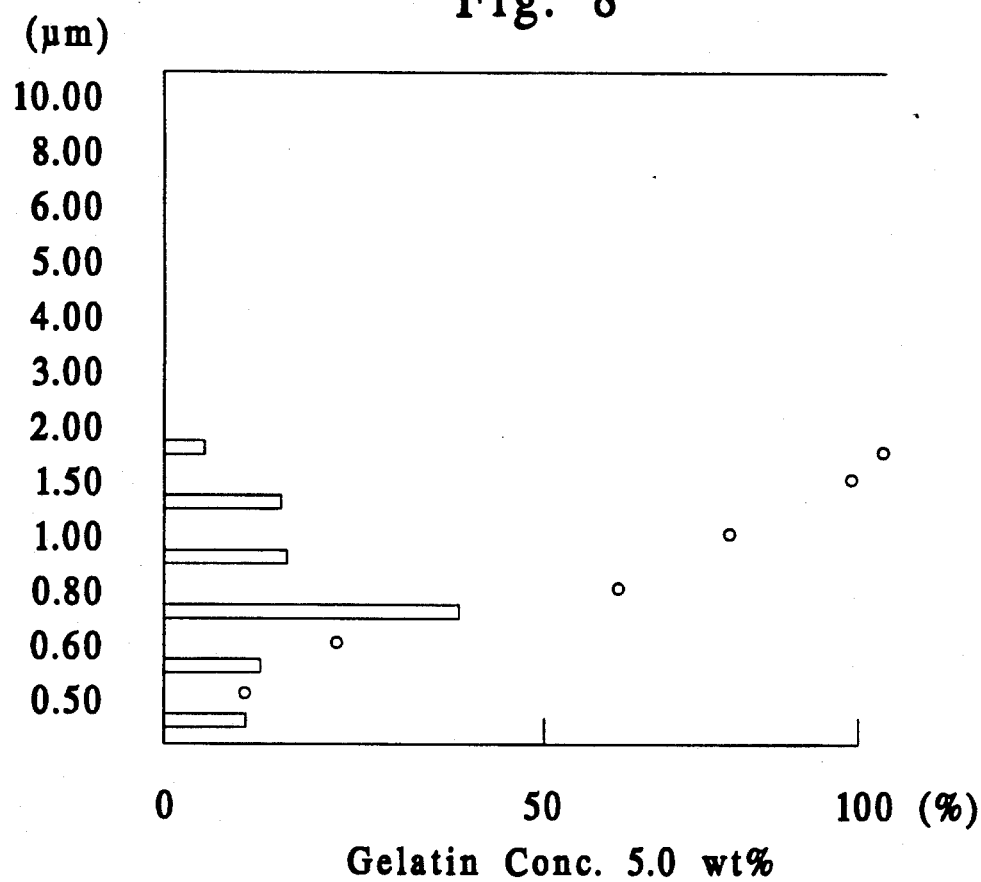
FIG. 8 is a diagram showing particle size distribution of production Experiment VI.

The particle size distribution of this zeolite Y was measured, the results being shown in FIG. 8. As will be seen from this Figure, an unrealistically small mean particle size of 0.73 μm, as well as very narrow particle size distribution of 0.5 to 2.0 μm, was obtained. In addition, the proportion of particles having particle sizes not greater than 1 μm was as large as 80%.

Figure 9:
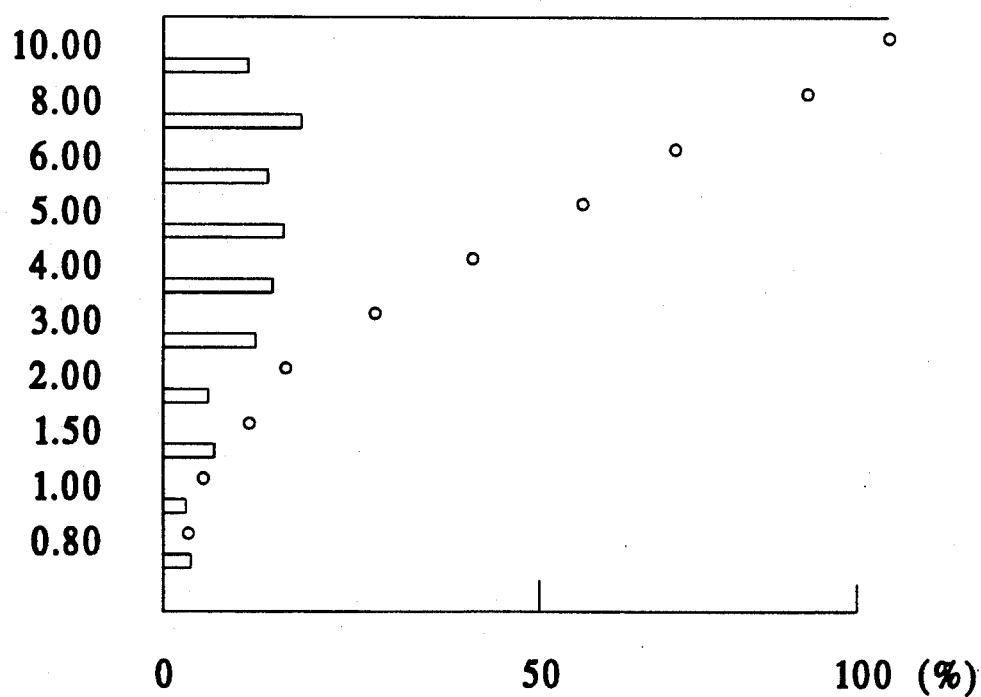

As a comparative example (Comparative Example VI), zeolite y was synthesized by the same process as Experiment VI except that gelatin was not added. FIG. 9 shows the results of measurement of particle size distribution of the thus obtained comparative example of zeolite. It will be seen that the comparative example has a mean particle size of 3.96 μm which is much greater than that of the product of Experiment VI. The particle size distribution which also was 0.8 to 10 μm, which also is much greater than that of the product of Experiment VI.

FIGS. 10A and 10B show electron-microscopic photos of the product of Experiment VI and the product of the comparison example. It will be seen that the product of Experiment VI, synthesized by using gelatin dissolved in the solvent, exhibits much smaller particle sizes with higher degree of uniformity, as well as rounded polygonal configurations approximating spheres, as compared with the product of comparison example prepared by the conventional process employing no gelatin. Thus, the superiority of the product produced by Experiment VI in accordance with the present invention is proved not only from the results of measurement but also through electron-microscopic observation.

EXPERIMENT VII

Aluminosilicate was synthesized and white powder of zeolite A was obtained by the same process as Experiment VI except that the amounts of colloidal silica, sodium aluminate and sodium hydroxide were respectively changed to 300 g, 187 g and 62 g.

Figure 11:
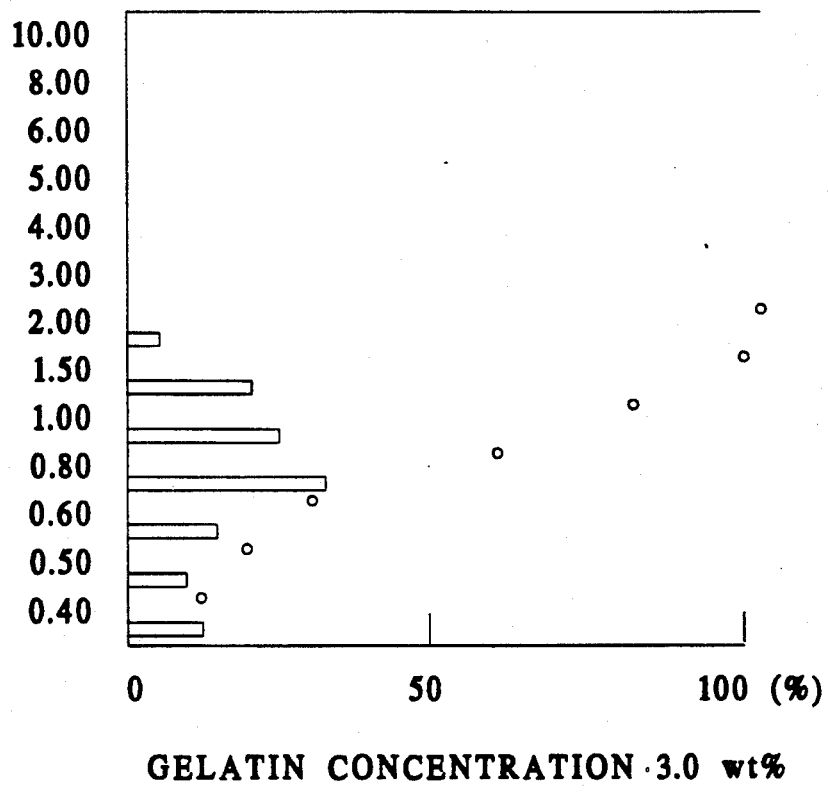
FIG. 11 is a graph showing particle size distribution of production Experiment VII.

The particle size distribution of this zeolite A was measured, the results being shown in FIG. 11. As will be seen from this Figure, an unrealistically small mean particle size of 0.75 μm, as well as very narrow particle size distribution of 0.4 to 2.0 μm, was obtained. In addition, the proportion of particles having particle sizes not greater than 1 μm was as large as 80%.

Figure 12:
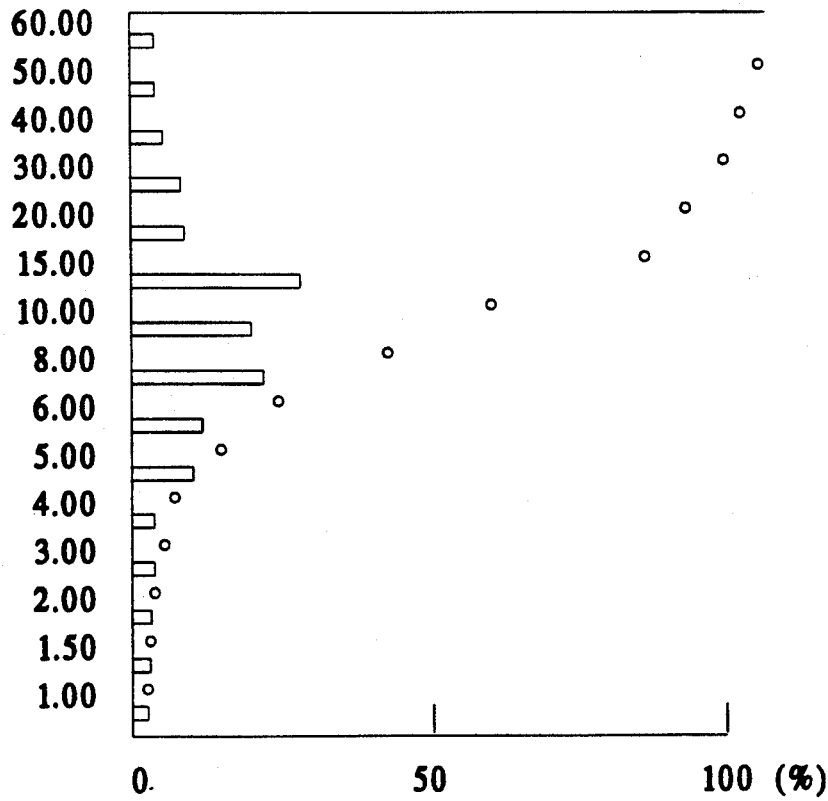
FIG. 12 is a graph showing particle size distribution of product in a Comparative Experiment to be compared with Experiment VII.

As a comparative example (Comparative Example VII), zeolite A was synthesized by the same process as Experiment VII except that gelatin was not added. FIG. 12 shows the results of measurement of particle size distribution of the thus obtained comparative example of zeolite. It will be seen that the comparative example has a mean particle size of 6.81 μm which much greater than that of the product of Experiment VI. The particle size distribution which also was 1.0 to 10 μm, which also is much greater than that of the product of Experiment VI.

Figure 13A:
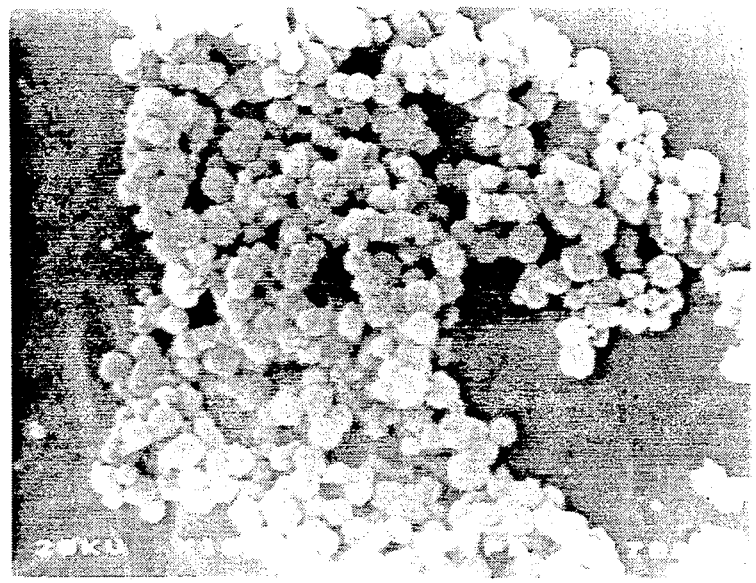
FIGS. 13A and 13B, respectively, are electron-microscopic photos showing constructions of particles of products in Experiment VII and the Comparative Experiment.
Figure 13B:
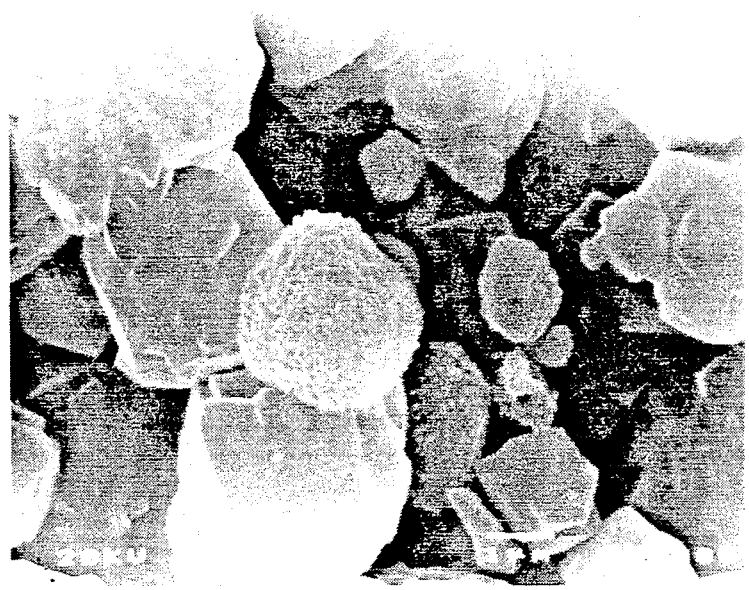

FIGS. 13A and 13B show electron-microscopic photos of the product of Experiment VI And the product of the comparison example. It will be seen that the product of Experiment VII, synthesized by using gelatin dissolved in the solvent, exhibits much smaller particle sizes with higher degree of uniformity, as well as rounded polygonal configurations approximating spheres, as compared with the product of comparison example prepared by the conventional; process employing no gelatin. Thus, the superiority of the product produced by Experiment VII in accordance with the present invention is proved not only from the results of measurement but also through electron-microscopic observation.

EXPERIMENT VIII

Next step, examine the ion-exchanging ability of the products of the Experiments VI and VII comparing with the products of the comparison examples of the Experiments VI and VII. The ion-exchanging ability was measured by putting 0.1 g of the product in 100 ppm of an aqueous solution of strontium chloride measured correctly and stirring under the room temperature and skimming above liquid and measuring a concentration of strontium-ion survived in the liquid by the Atomic Absorption Analysis. By calculating the results of the measurement, each amount of strontium ion-exchanging by mg equivalent per 100 g each samples were shown by FIG. 14.

The FIG. 14 shows that the zeolite produced by Experiments VI and VII have a rapid reaction velocity, comparing to the zeolite produced by the Comparison Examples VI and VII, and some zeolite have a high ion-exchanging ability, thus it is proved that this invention is superior.

What is claimed is:

1. A process for producing a micro-particulate aluminosilicate, comprising the steps of:
    preparing an aqueous solution as a solvent, said aqueous solution containing gelatin dissolved therein;
    adding to said aqueous solution a metal hydroxide or a metal salt, a metal aluminate and colloidal silica as essential components and stirring the mixture to uniformly disperse said essential components and allow the mixture to mature; and
    heating said mixture to synthesize said micro-particulate aluminosilicate.

2. A process for producing micro-particulate aluminosilicate according to claim 1, wherein the addition of said metal hydroxide or metal salt, metal aluminate and colloidal silica is conducted by adding colloidal silica first to said aqueous solution in which said water-soluble polymer is uniformly dissolved, stirring the mixture to uniformly disperse said colloidal silica, gradually adding aqueous solutions of said metal hydroxide or metal salt and said metal aluminate, and wherein said mixture is obtained by conducting as necessitated a strong agitation of the mixture after addition of said metal hydroxide or metal salt and said metal aluminate.

3. A process for producing a micro-particulate aluminosilicate (zeolite) formed by allowing metal hydroxide or a metal salt and colloidal silica to react in a solvent formed of an aqueous solution, comprising the steps of:

preparing an aqueous solution as a solvent, said aqueous solution containing gelatin;

adding gradually to said aqueous solution a metal hydroxide or metal salt, a metal aluminate and colloidal silica as essential components, and stirring the mixture to uniformly disperse said essential components; and synthesizing said micro-particulate aluminosilicate having a mean particle size of not greater than 3 $\mu$m as measured by precipitation particle size distribution measuring method by allowing said mixture to mature and then to react by being heated.

* * * * *